Patented July 30, 1929.

1,722,776

UNITED STATES PATENT OFFICE.

HARRY M. WEBER, OF BLOOMFIELD, NEW JERSEY, ASSIGNOR TO ELLIS-FOSTER COMPANY, A CORPORATION OF NEW JERSEY.

COMPOSITION OF MATTER COMPRISING RESIN ESTERS.

No Drawing.  Application filed October 20, 1922. Serial No. 595,862.  REISSUED

This invention relates to compositions comprising artificial resins and cellulose esters and relates especially to compositions containing artificial resins derived by reaction between organic acids and polyhydric alcohols.

In the present invention it is an object to provide a composition which has qualities of toughness, flexibility, extensibility and the like enabling tough spirit varnishes to be prepared and also to permit of the employment of the toughened material in the production of films, plastic compositions, molded articles and the like.

As is well known nitrocellulose is incompatible with a great many substances. Most of the resins which dissolve in solvents for nitrocellulose are not miscible with the latter and when a solution containing any substantial amount of resin and nitrocellulose is allowed to dry the solid components segregate and a worthless mass results. Of course nitrocellulose will assimilate small quantities of resins without greatly affecting its toughness and flexibility but no substantial amounts may be added without impairing the qualities for which nitrocellulose is employed.

I have found that the rosin phthalic glyceride resin will dissolve, mix or blend with nitrocellulose and apparently in almost any proportion. Hence it becomes possible to introduce nitrocellulose, pyroxylin, soluble cotton, celluloid such for example as scrap celluloid and used moving picture film to serve as a toughening agent. The addition of 10 to 20 per cent of such nitrocellulose compounds greatly improves the toughness of the resin and still larger quantities may be used when additional toughness is desired. For example by the addition of 25 to 30 per cent of nitrocellulose to the rosin phthalic glyceride resin the resin solution poured out on glass will dry to a film which is clear and may be lifted from the glass in its entirety. Still greater amounts of nitrocellulose such as 40 or 50 per cent serve to increase the filming properties and the toughness of the resulting films. One may proceed further with additions of nitrocellulose so that the latter component predominates and the resin may be present in amounts of 40, 30, 20, 10 per cent etc. as may be desired when films of great toughness or special plastic products are required. The rosin phthalic glyceride resin as ordinarily prepared is not as light in color as good quality nitrocellulose and the tint resulting from the presence of a large proportion of the rosin phthalic glyceride resin is objectionable for some purposes, in which case the nitrocellulose may predominate.

There are many uses for such a material as for example varnishes, lacquers, japans, paints, substitutes for hard rubber and various other molded plastic products, films for various purposes as for example the windshields of automobiles and other purposes for which films of this general character may be utilized appropriately.

The rosin phthalic glyceride resin in a form readily soluble in acetone and the customary solvents of nitrocellulose is of itself more readily affected by water than nitrocellulose and the latter besides having a toughening and strengthening effect also co-operates with the rosin phthalic glyceride resin to increase the resistance to water, so that spotting or disintegration of the surface through the action of water is not as likely to occur. On the other hand the presence of a substantial or predominating amount of the rosin phthalic glyceride resin apparently reduces the inflammability and explosibility of nitrocellulose to a considerable extent which of course is advantageous for many purposes.

In addition to rosin I may of course use other appropriate resins such as copal resins whose esters are of a character adapted to admix with nitrocellulose or other cellulose esters or ethers. Thus I may prepare a resin phthalic glyceride resin from congo or other copal resin, phthalic acid and glycerine preferably with the addition of some rosin to serve as a fluxing agent. While I have mentioned phthalic acid particularly it should be understood that I embrace within the scope of this application various other organic acids capable of esterifying with glycerine to give complexes soluble in the usual solvents of the nitrocellulose industry, e. g. methyl, ethyl and amyl alcohol, ethyl acetate, amyl acetate and in mixtures of such solvents with hydrocarbon diluents such as benzol or toluol. The acids preferably employed are polybasic aliphatic acids such as maleic, fumaric, succinic, malic, citric, tartaric acids and the like or aromatic acids of a dibasic character of which phthalic acid is an example. Benzoic acid and similar monobasic acids may be employed in some cases. The purpose of the employment of the mono or dibasic acid in the esterification of the polyhydric alcohol with a resin acid is probably clear from the foregoing. Its function is to render the rosin phthalic glyceride resin soluble in nitrocellulose solvents and to make the resin phthalic glyceride resin capable of blending with nitrocellulose whereby the latter may be employed as a toughening agent for the resin phthalic glyceride resin, or on the other hand the latter may be used as a means of modifying the character of nitrocellulose or cheapening it. The addition of softening agents such as castor oil, camphor, triphenyl or tricresyl phosphate, diethyl phthalate and the like is not excluded although many useful compositions may be prepared without the addition of such softening agents. Scrap celluloid containing camphor or camphor substitute forms a cheap and readily available toughening agent for the resinous complex.

When a solution of nitrocellulose in for example acetone without any water eliminant such as fusel oil or amyl acetate is allowed to dry a white, opaque film usually forms. When a substantial proportion of the rosin phthalic glyceride resin of this invention is present no such whitening and opacity is observed a clear film being formed as though a special water eliminant had been added.

To illustrate the toughening effect that the addition of small quantities of nitrocellulose has on coatings prepared from solutions of the resin phthalic glyceride resin the following examples are cited.

5 parts of soluble cotton mixed with 95 parts of the rosin phthalic glyceride resin were dissolved in acetone and the solution was allowed to flow on a glass plate. The coating was then dried and allowed to harden for a period of 24 hours. A similar coating was prepared from a solution of the rosin phthalic glyceride resin and comparative tests made on the resulting coatings. I found that the addition of this small amount of nitrocellulose toughened the resulting coating considerably. The rosin phthalic glyceride resin coating could readily be scratched with a sharp cornered flake of shellac while the coating containing the nitrocellulose was not scratched. Coatings containing 10 per cent, 20 per cent, 33⅓ per cent and 50 per cent nitrocellulose or soluble cotton behaved in a similar manner. All of the coatings were clear and transparent the color varying proportionally with the amount of nitrocellulose incorporated with the resin. The coatings containing 20 per cent and more of nitrocellulose could be stripped from the glass plates intact.

The rosin phthalic glyceride resin is miscible with nitrocellulose in all proportions and as an illustration the following example is given.

5 parts of rosin phthalic glyceride resin and 95 parts of soluble cotton were dissolved in 2000 parts of acetone. A film prepared by flowing the solution on a glass plate and allowing the film to dry was slightly more brittle than a film prepared from soluble cotton alone. The addition of one part of castor oil to the solution however remedied this defect and the coating obtained was hard, tough, flexible and transparent. As an example of a varnish which is suitable for coating floors and the like the following is cited. 25 parts of rosin phthalic glyceride resin and 50 parts of scrap motion picture film was dissolved in a solution consisting of a mixture of 100 parts of acetone and 50 parts of benzol. The solution prepared in this manner was quite viscous but would flow readily at room temperature. A coating obtained by the use of this solution was tough and transparent and light yellow in color.

As another example a solution of 90 parts of rosin phthalic glyceride resin, 10 parts of scrap motion picture film was dissolved in 14 parts of acetone. A coating obtained by the use of this solution was tough, transparent and resistant to the action of water.

The condition of compatibility may be ascribed to a state of solid solution, that is the nitrocellulose and the synthetic resin dissolve in one another or are so intimately mixed that a clear, transparent, tough solid results. With an incompatible resin, a turbid, opaque, weak solid is obtained and this condition usually presents itself at the point where most of the solvent has evaporated. Such solid solution may form in the first instance when using a resin which is not compatible with nitrocellulose but on standing or through unknown causes, changes may occur due to separation or expulsion of one component from the immediate zone of the other and substantial deterioration result.

By the term "resin acid" as used in the claims, it is intended to cover acids which are normal constituents of resins.

What I claim is:

1. A composition of matter comprising a rosin phthalic glyceride resin soluble in nitrocellulose solvents, admixed with nitrocellulose.

2. A composition of matter comprising a rosin phthalic glyceride resin soluble in nitrocellulose solvents, incorporated with nitrocellulose and a softening agent.

3. A composition of matter comprising a glycerol ester of a resin and an organic carboxylic acid, incorporated with nitrocellulose.

4. A composition of matter comprising a glycerol ester of a resin and an organic carboxylic acid, incorporated with a cellulose ester.

5. A composition of matter comprising a polyhydric alcohol ester of a resin and an organic carboxylic acid, incorporated with nitrocellulose.

6. A composition of matter comprising a glycerol ester of a resin and phthalic acid incorporated with nitrocellulose.

7. A composition of matter comprising a glycerol ester of rosin and phthalic acid incorporated with nitrocellulose.

8. A composition of matter comprising a glycerol ester of rosin and phthalic acid incorporated with nitrocellulose and a softening agent.

9. A composition of matter comprising glycerol ester of rosin and phthalic acid incorporated with a toughening agent comprising nitrocellulose.

10. A composition of matter comprising the glycerol ester of a resin and an organic dibasic acid with which is incorporated a toughening agent comprising nitrocellulose.

11. A varnish consisting of a solution of a glycerol ester of a resin and an organic carboxylic acid incorporated with nitrocellulose.

12. A plastic substance comprising a glycerol ester of a resin and an organic dibasic acid incorporated with nitrocellulose.

13. A plastic composition containing a resin-phthalic-glyceride resin which yields phthalic acid upon hydrolysis, admixed with nitrocellulose.

14. A plastic composition containing a resin-dibasic, organic acid-glyceride resin, which yields an organic, dibasic acid upon hydrolysis, admixed with nitrocellulose.

15. A composition of matter comprising a glycerol ester of rosin and phthalic acid incorporated with a toughening agent containing nitrocellulose.

16. A composition of matter comprising the polyhydric alcohol ester of a resin and an organic carboxylic acid with which is incorporated a toughening agent containing nitrocellulose.

HARRY M. WEBER.